(12) United States Patent
Mattioli

(10) Patent No.: US 11,455,159 B2
(45) Date of Patent: Sep. 27, 2022

(54) WIRELESSLY UPDATING FIELD PROGRAMMABLE GATE ARRAYS UPON DETECTION OF HARDWARE VULNERABILITY

(71) Applicant: Goldman Sachs & Co. LLC, New York, NY (US)

(72) Inventor: Michael Mattioli, Staten Island, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 174 days.

(21) Appl. No.: 16/941,393

(22) Filed: Jul. 28, 2020

(65) Prior Publication Data

US 2022/0035616 A1 Feb. 3, 2022

(51) Int. Cl.
*G06F 8/65* (2018.01)
*G06F 8/20* (2018.01)
(Continued)

(52) U.S. Cl.
CPC .............. *G06F 8/65* (2013.01); *G06F 21/577* (2013.01); *H04L 41/082* (2013.01); *H04L 63/1433* (2013.01); *H04L 63/20* (2013.01)

(58) Field of Classification Search
CPC ........ G06F 30/34; G06F 30/33; G06F 11/273; G06F 11/3616; G06F 11/0751; G06F 9/526; G06F 9/524; G06F 8/65; G06F 8/658; G06F 11/1433; G06F 11/079; G06F 8/60; G06F 8/654; G06F 8/656; G06F 9/44521; G06F 9/445; G06F 11/1629; G06F 11/0721; G06F 9/4401; G06F 11/0793; H04L 69/22; H01L 2924/00; H01L 2924/00014;
(Continued)

(56) References Cited

U.S. PATENT DOCUMENTS 10,691,810 B1 6/2020 Freitag et al.
11,165,808 B2 * 11/2021 Murthy ..................... G06F 8/65
(Continued)

FOREIGN PATENT DOCUMENTS

TW 1682644 B 1/2020

OTHER PUBLICATIONS

Li et al., Detecting Malicious Attacks Exploiting Hardware Vulnerabilities Using Performance Counters, 10 pages (Year: 2019).*
(Continued)

*Primary Examiner* — Thuy Dao
(74) *Attorney, Agent, or Firm* — Fenwick & West LLP

(57) ABSTRACT

A mechanism for wirelessly updating an FPGA that is built into a wireless mobile or another wireless electronic device is described herein. The wireless update may be performed responsive to detecting a hardware vulnerability or another hardware issue in the mobile device. When the hardware vulnerability or another hardware issue is detected, the mechanism may identify a fix for the hardware vulnerability. A fix may be a particular FPGA configuration update known to fix the issue. The configuration update to the FPGA is received and the current FPGA configuration is overwritten with data from the configuration update. A determination is made that the hardware vulnerability no longer exists.

17 Claims, 5 Drawing Sheets

(51) Int. Cl.
  *G06F 9/44* (2018.01)
  *G06F 21/57* (2013.01)
  *H04L 41/082* (2022.01)
  *H04L 9/40* (2022.01)
(58) Field of Classification Search
  CPC . H01L 2924/00012; H01L 2924/05147; H01L 2924/13109
  See application file for complete search history.

(56) References Cited

U.S. PATENT DOCUMENTS

| | | |
|---|---|---|
| 2004/0004637 A1 | 1/2004 | Ghercioiu et al. |
| 2004/0010571 A1 | 1/2004 | Hutchinson et al. |
| 2018/0067810 A1* | 3/2018 | Li ..................... G06F 11/142 |
| 2019/0049912 A1 | 2/2019 | Poornachandran et al. |
| 2020/0120458 A1 | 4/2020 | Aldana et al. |
| 2020/0177613 A1 | 6/2020 | Nilangekar et al. |
| 2021/0119632 A1* | 4/2021 | Zhu ................. H03K 19/17728 |

OTHER PUBLICATIONS

PCT International Search Report and Written Opinion, PCT Application No. PCT/IB2021/054715, dated Aug. 31, 2021, nine pages.
Taiwan Intellectual Property Office, Office Action, Taiwanese Patent Application No. 110126111, dated Apr. 27, 2022, 14 pages.

* cited by examiner

WIRELESSLY UPDATING FIELD PROGRAMMABLE GATE ARRAYS UPON DETECTION OF HARDWARE VULNERABILITY

TECHNICAL FIELD

This disclosure generally relates to field programmable gate arrays ("FPGAs"), and more particularly to performing wireless configuration updates to the FPGAs.

BACKGROUND

Various electronic devices are built with one or more FPGAs instead of a conventional processor or processors. FPGAs are generally semiconductor devices which contain programmable gates or blocks and interconnection circuits. FPGAs include hardware components that, unlike hardware components of regular processors, may be reprogrammed after manufacture for different tasks. To program or reprogram an FPGA a Hardware Description Language ("HDL") definition or a schematic design may be used. Generally, the HDL definition or schematic design is uploaded to the FPGA through a wired connection while the FPGA is in a configuration mode. Once the transfer is complete, the FPGA switches to user mode for performing programmed functions. The update processes are generally done in a lab or in a controlled environment. Thus, it is very difficult to update the hardware configuration of the FPGA on consumer electronic devices because these devices are no longer controlled by the manufacturer (e.g., they are in the hands of consumers) and having consumers ship devices back for reconfiguration is a very resource intensive process.

SUMMARY

Therefore, this disclosure describes a mechanism for wirelessly updating an FPGA that is built into a wireless mobile or another wireless electronic device even after the device has left the manufacturer. The wireless update may be performed responsive to detecting a hardware vulnerability or another hardware issue in the mobile device that includes an FPGA. When the hardware vulnerability or another hardware issue is detected (e.g., by a software executed on the mobile device), the mechanism may identify a fix for the hardware vulnerability. For example, a fix may be a particular FPGA configuration update known to fix the issue. A request is transmitted to a server for the fix to the hardware vulnerability and configuration update to the FPGA is received from the server responsive to the request. The current FPGA configuration is then overwritten with data from the configuration update and a determination is made that the hardware vulnerability no longer exists.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates a system for wirelessly updating an FPGA that is built into a wireless mobile or another wireless electronic device, in accordance with some embodiments of this disclosure.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
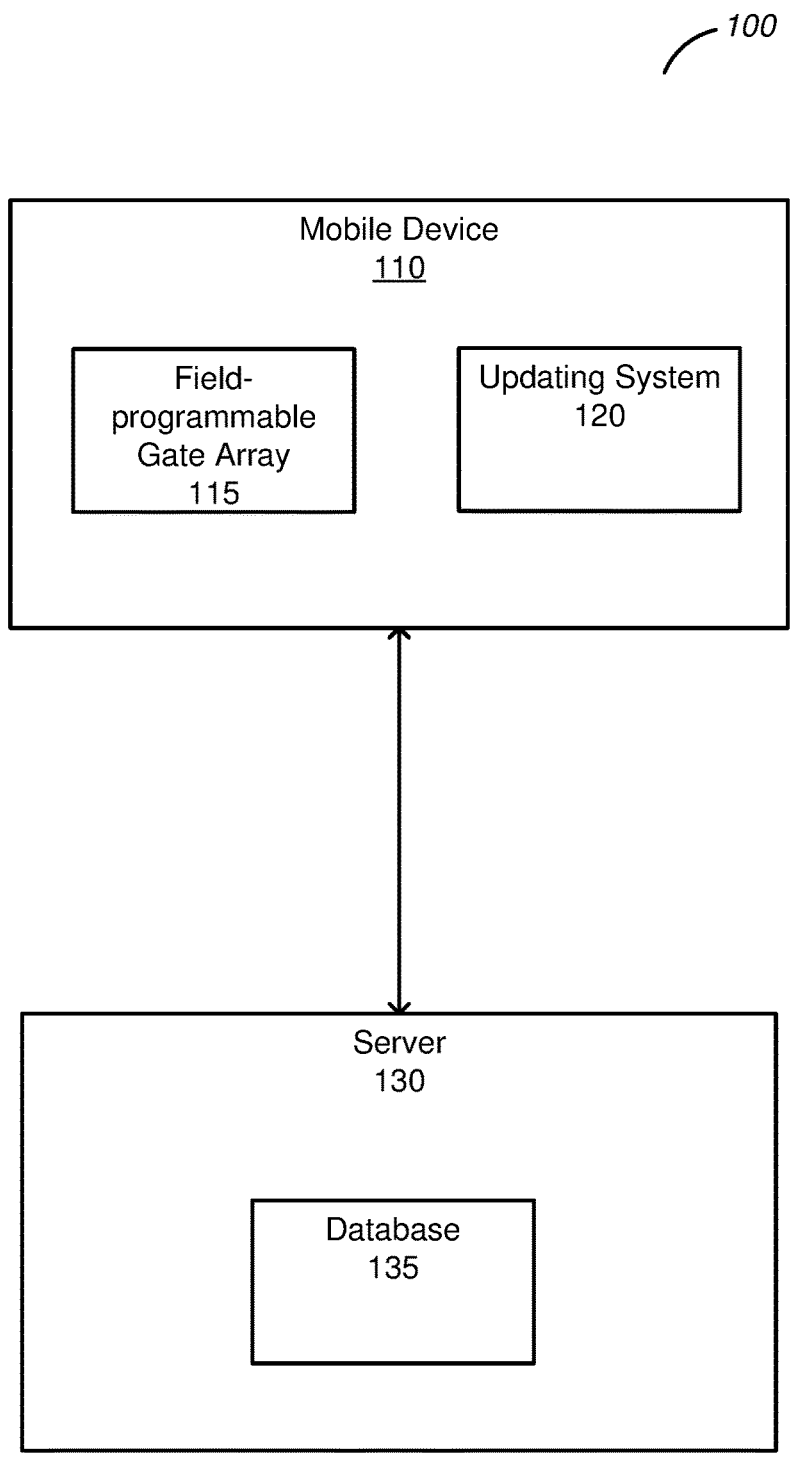

FIG. 1 illustrates a system (a wireless update system) for wirelessly updating an FPGA that is built into a wireless mobile or another wireless electronic device. Wireless update system 100 includes a mobile device 110 (with a wireless connection) and a server 130. Mobile device 110 may be any electronic device with wireless connectivity, e.g., a smart phone, an electronic tablet, a portable computer, or another suitable device. Mobile device 110 includes a field programmable gate array 115 and an updating system 120. FPGA 115 performs processing functions as any other processor may perform. Updating system 120 may receive an FPGA configuration update through a particular interface for receiving an FPGA configuration update, process that update, and apply the update to FPGA 115. Mobile device 110 may communicate with server 130 during the FPGA configuration update process.

Server 130 may be one or more servers configured to communicate with mobile devices (e.g., mobile device 110). Server 130 may include database 135 that stores various FPGA configurations and/or FPGA configuration metadata for updating FPGA configurations on mobile devices. In some embodiments, server 130 may include one or more software applications configured to be executed on mobile devices for detecting vulnerabilities or other issues that may be resolved by applying an FPGA configuration update. Server 130 may store different applications for different types of mobile devices (e.g., for mobile devices with different operating systems). That is, server 130 may determine a type associated with the mobile device (e.g., based on the operating system of the mobile device) and select the appropriate application based on the type associated with the mobile device. Server 130 may transmit an appropriate application to each mobile device, which is executed on the mobile device to identify any hardware vulnerabilities or other issues that may be fixed by applying an update to the FPGA configuration of the device.

Figure 2:
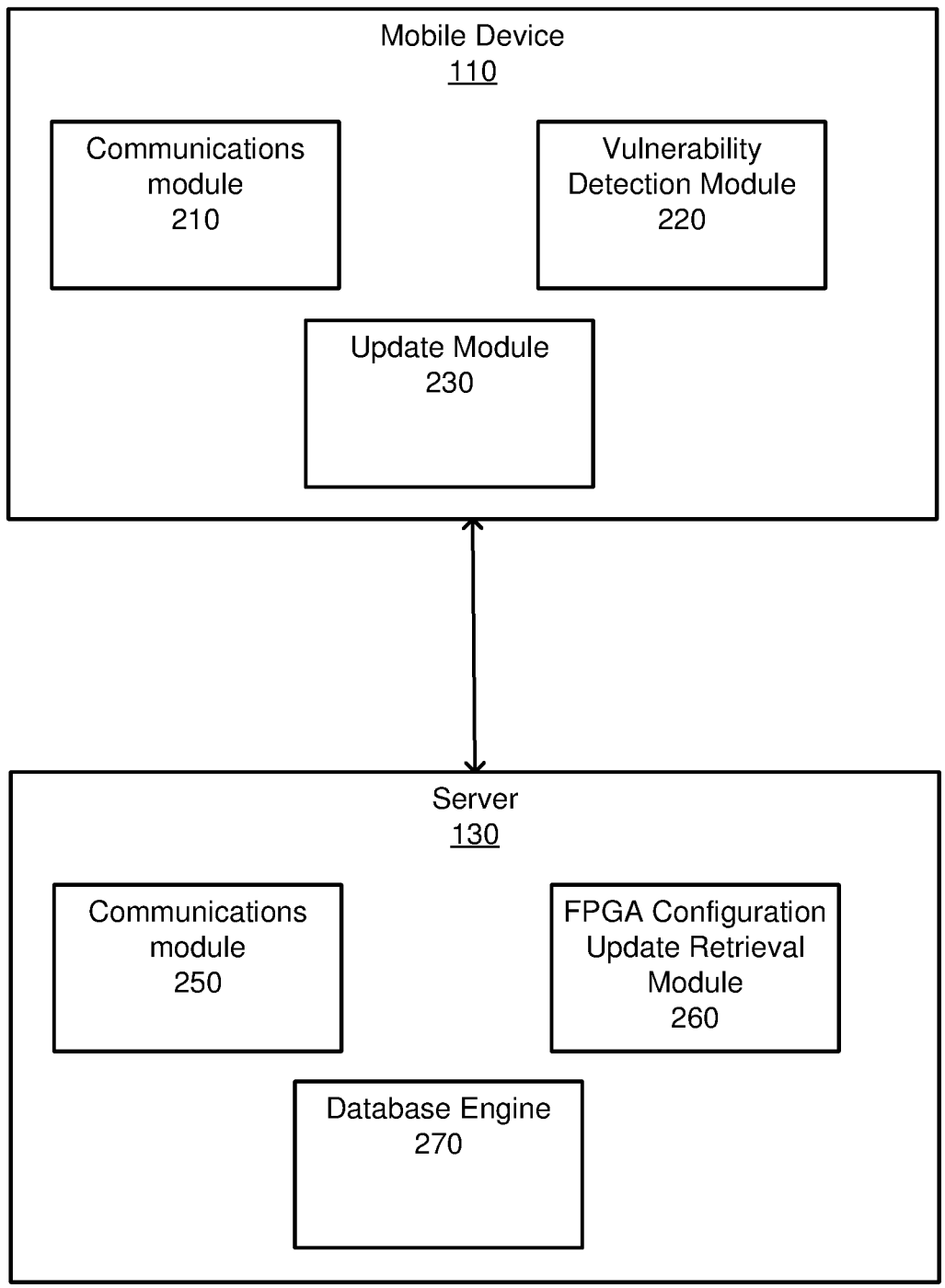
FIG. 2 illustrates exemplary modules of a system for wirelessly updating an FPGA, in accordance with some embodiments of this disclosure.

FIG. 2 illustrates exemplary modules of a system for wirelessly updating an FPGA. The wireless update system may include, on mobile device 110, communications module 210, vulnerability detection module 220, and update module 230. The wireless update system may also include communications module 250, FPGA configuration update retrieval module 260, and database engine 270 on server 130. The modules depicted in FIG. 2 are merely exemplary; fewer or more modules may be included to execute the functions described with respect to the wireless update system.

Figure 3:
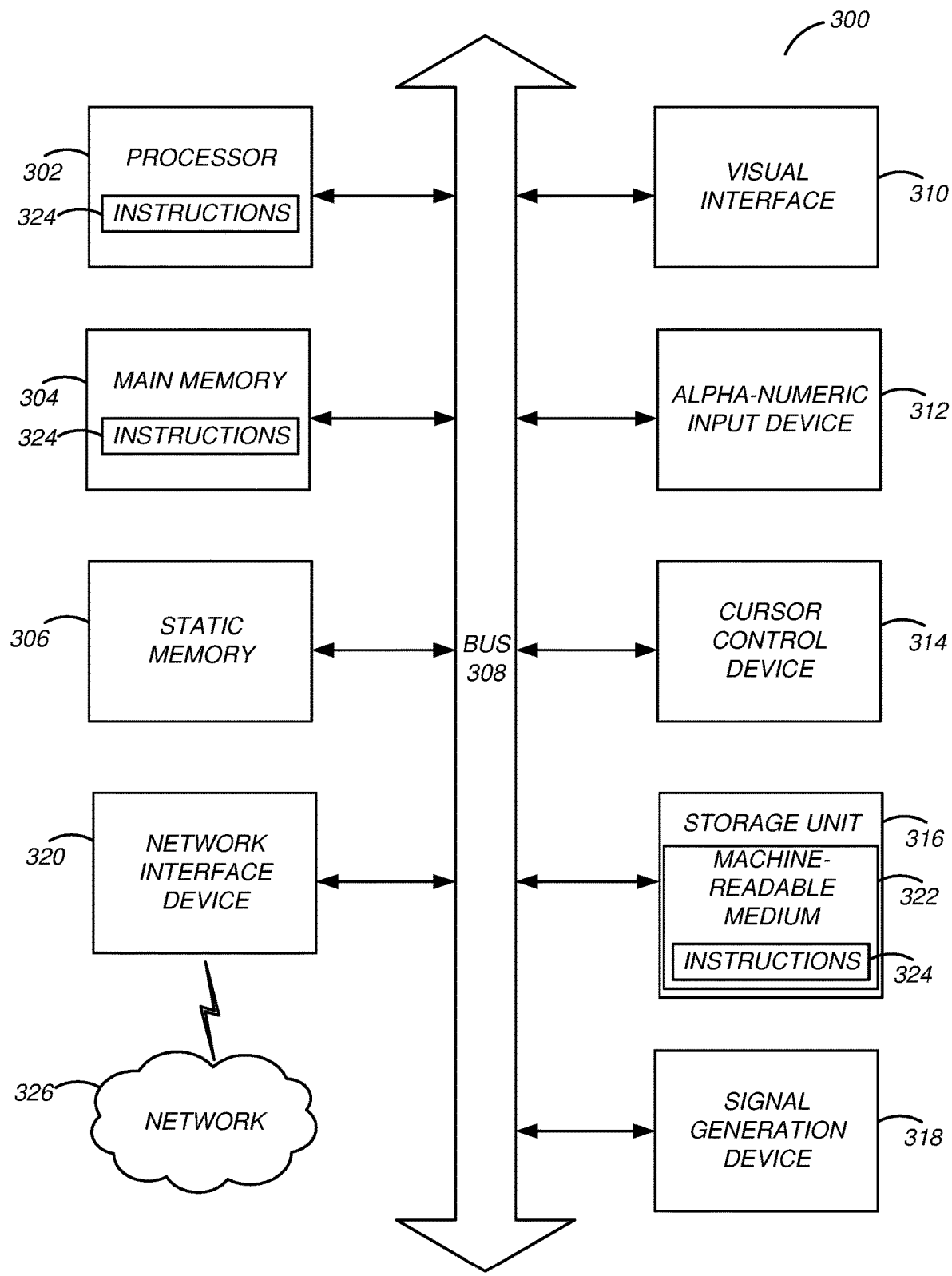
FIG. 3 is a block diagram illustrating components of an example machine able to read instructions from a machine-readable medium and execute them in a processor (or controller).

Mobile device 110 includes communications module 210. Communications module 210 may include circuitry providing wireless connectivity to the mobile device. Thus, communications module 210 may communicate with server 130 via the wireless connection. The mobile device may receive one or more applications via communications module 210 that may be used for detecting hardware vulnerabilities or other issues that may be fixed with an appropriate configuration update to the FPGA. A security flaw that may be fixed with an FPGA update may be hardware vulnerability. A battery issue (e.g., overheating/overusing the battery) caused by a particular configuration of the FPGA may be a hardware vulnerability. Communications module 210 may include a software portion, a hardware portion, or a combination of the two. In some embodiments, communications module may include network interface device 320 (FIG. 3).

Vulnerability detection module 220 detects a hardware vulnerability in the mobile device. For example, vulnerability detection module 220 may execute an application (e.g., application wirelessly downloaded from server 130) on the mobile device to detect the hardware vulnerability. In some embodiments, vulnerability detection module 220 via the application may retrieve a plurality of state codes for a plurality of hardware devices that are part of the mobile device. The state codes may be generated by the hardware devices as the hardware devices perform their tasks. In some embodiments, vulnerability detection module 220 may, via the application and using application programming interfaces of each of the hardware devices, instruct each of the hardware devices to generate a state code. For example, vulnerability detection module 220 may instruct a hardware device (e.g., via a command) to execute a state check and output the resulting state code. In some embodiments, a battery system may return a specific code indicating that the battery overheats or is overused.

Vulnerability detection module 220 may compare each state code of the plurality of state codes with state codes in a list of state codes. One or more state code in the list of state codes may have a corresponding hardware vulnerability. For example, the mobile device may download a list of state codes and corresponding hardware vulnerabilities. Vulnerability detection module 220 may, via the application, retrieve the list from memory to perform the comparison. In some embodiments, the list of state codes may be stored in a database (e.g., database 135 on server 130). Vulnerability detection module 220 may transmit the codes to the server for comparison. In some embodiments, vulnerability detection module 220 may retrieve the list of state codes from the server to perform the comparison.

In some embodiments, the list of state codes may include a combination of state codes that correspond to a hardware vulnerability. For example, to match a particular hardware vulnerability, a combination of devices may have to output specific state codes. That is, device one may output a specific state code (e.g., a particular hexadecimal value) and device two may output its own specific state code (e.g., another hexadecimal value). If both state codes match the statues codes in the list, vulnerability detection module 220 determines that the matching hardware vulnerability has been detected. A state code may be any unique value, for example, a decimal number, a hexadecimal number, a string, or another suitable state code.

In response to determining that at least one of the state codes matches a state code in the list of state codes, vulnerability detection module 220 detects the hardware vulnerability. For example, vulnerability detection module 220 may store a hardware vulnerability identifier (e.g., a hexadecimal value) corresponding to the hardware vulnerability. A hardware vulnerability may be any hardware issue can be fixed by reconfiguring the FPGA. For example, a hardware vulnerability may be detected when the FPGA is causing the mobile device to overheat due to the gate or block configuration. Another example of a hardware vulnerability may be inappropriate power usage (e.g., using too much or too little power). Using too much power may cause the mobile device to overheat and/or run out of power quickly where it needs to recharge more often. Using too little power may cause the mobile device to inadequately perform when performance is needed.

In some embodiments, when performing detection, vulnerability detection module 220 may receive, from server 130, executable code configured to detect the hardware vulnerability. That is, the application referred above may be received prior to executing the process for wirelessly updating the FPGA or during the process for wirelessly updating the FPGA. In some embodiments, the executing code (e.g., application described above) may be loaded onto the mobile device prior to needing the update (e.g., when the device is manufactured) and executed during the process for wirelessly updating an FPGA by, for example, a built-in function triggered from server 130. In some embodiments, the executable code may be downloaded to the mobile device during the process for wirelessly updating an FPGA, for example, by vulnerability detection module 220. Vulnerability detection module 220 then executes the executable code. The executable code, as discussed above, may read and/or cause the hardware devices within the mobile device to generate the plurality of state codes and collect those state codes.

In response to detecting the hardware vulnerability on the mobile device, vulnerability detection module 220 identifies a configuration update to the FPGA that fixes the hardware vulnerability. For example, vulnerability detection module 220 may store a hardware vulnerability identifier that matches the status code. Vulnerability detection module 220 may retrieve the stored hardware vulnerability identifier and compare the hardware vulnerability identifier with each hardware vulnerability identifier in a list of hardware vulnerability identifiers. Some of the hardware vulnerability identifiers in the list may have a corresponding configuration update for the FPGA. That is, the corresponding configuration update for the FPGA is known to fix the hardware vulnerability. In response to determining that the hardware vulnerability identifier matches a hardware vulnerability identifier in the list, vulnerability detection module 220 may store the matching hardware vulnerability identifier. For example, vulnerability detection module 220 may store a hexadecimal value as the hardware vulnerability identifier.

Vulnerability detection module 220 may pass the hardware vulnerability identifier to update module 230. Update module 230 may receive the hardware vulnerability identifier and transmit, to server 130, a request for the fix to the hardware vulnerability. The request may include an identifier of the configuration update to the FPGA. In some embodiments, the identifier of the configuration update to the FPGA may be the hardware vulnerability identifier that was passed from the vulnerability detection module. While in some embodiments, the identifier of the configuration update to the FPGA may be a different value. For example, the identifier of the configuration update to the FPGA may correspond to a hardware vulnerability identifier. Mobile device 110 and/or server 130 may store a table that includes hardware vulnerability identifiers and corresponding identifiers of the configuration update to the FPGA.

Update module 230 may perform the transmission through communications module 210. For example, update module 230 may pass the request to communications module 210 to be sent to server 130. Update module 230 may receive, from server 130, the configuration update to the FPGA. Update module 230 may receive the configuration update through communications module 210. That is, communications module 210 may pass the response, including the configuration update to the FPGA to update module 230. Update module 230 may then overwrite a current FPGA configuration with data from the configuration update. After the update complete and/or during the update process update module 230 may restart mobile device 110 one or more times.

When the update is complete, update module 230 may determine whether the hardware vulnerability no longer exists. For example, update module 230 may re-execute the executable code described above which may retrieve one or more new state codes generated in response to re-execution of the executable code. Update module 230 may determine, based on the one or more new state codes, whether the vulnerability no longer exists. For example, update module 230 may compare the retrieved state codes with state codes in a list of state codes indicating that the fix was successful. If a state code or a combination of state codes match a state code or a combination of state codes in the list, update module 230 may determine that the hardware vulnerability no longer exists.

Server 130 may include communications module 250, FPGA Configuration update retrieval module 260, and a database engine 270. Communications module 250 may transmit and receive various data to and from mobile device 110. Communications module 250 may transmit, to the mobile device, executable code for detecting hardware vulnerabilities. As discussed above, the executable code may be an application executed on the mobile device. Communications module 250 may receive, from mobile device 110, a request for a fix to a detected hardware vulnerability. When communications module 250 receives the request, communications module 250 may pass the request to FPGA Configuration Update Retrieval Module 260.

FPGA configuration update retrieval module 260 may extract, from the request, an identifier of a configuration update to the FPGA. FPGA configuration update retrieval module 260 may generate a database query using the extracted identifier for a configuration update to the FPGA and transmit the query to database engine 270. Database engine 270 may cause retrieval from a database (e.g., database 135) of various configuration updates to the FPGA and corresponding identifiers. That is, database engine 270 may access a database table and retrieve a configuration update to the FPGA by submitting an identifier to the database. Database engine 270 may store other information including, for example, state codes and corresponding hardware vulnerability issues.

FPGA configuration update retrieval module 260 may receive, from database engine 270, a matching configuration update to the FPGA and pass the configuration update to communications module 250. Communications module 250 may transmit the configuration update to the FPGA to mobile device 110. In some embodiments, communications module 250 may receive, from mobile device 110, a confirmation that the hardware vulnerability has been fixed. The confirmation may be stored using database engine 270 in a database with a corresponding mobile device identifier to evidence that the corresponding mobile device has been fixed.

Computing Machine Architecture

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alpha-numeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Figure 4:
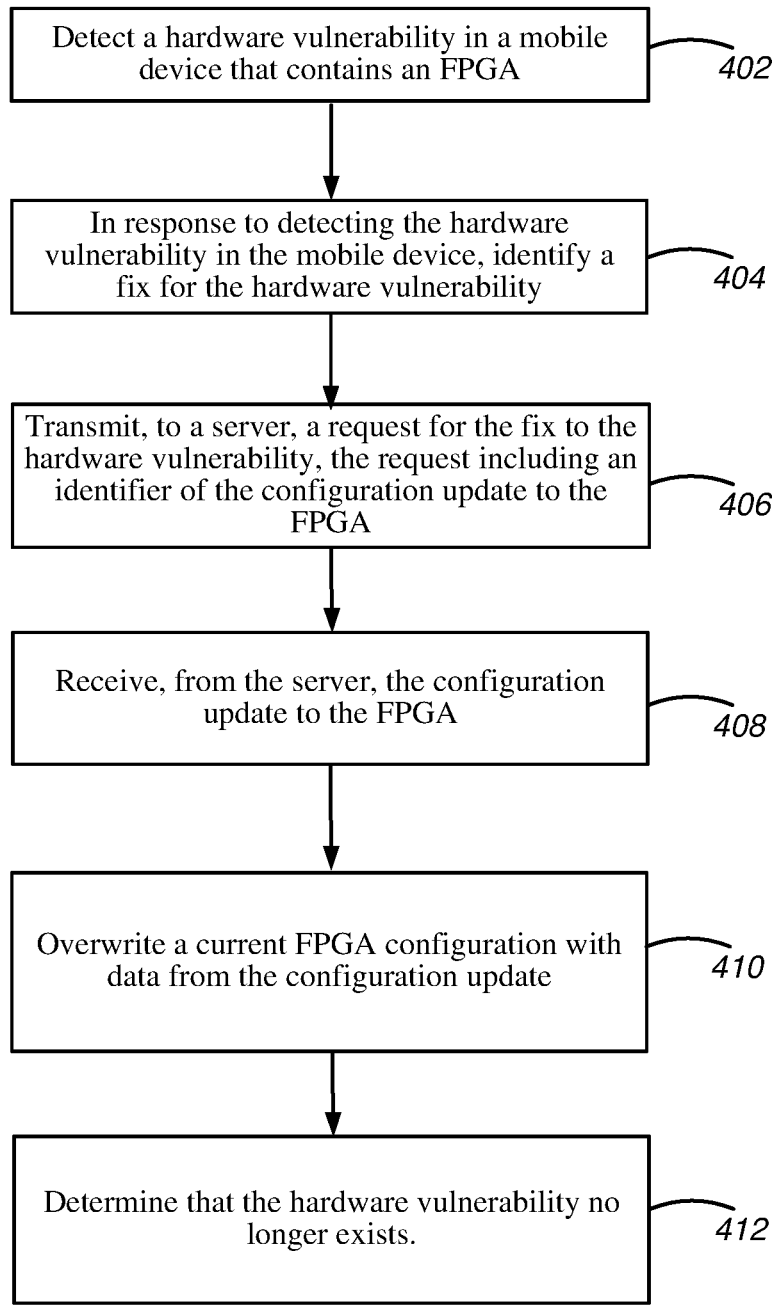
FIG. 4 illustrates a flow chart for wirelessly updating an FPGA, in accordance with some embodiments of this disclosure.

FIG. 4 illustrates flow chart 400 for wirelessly updating an FPGA, in accordance with some embodiments of this disclosure. The actions of FIG. 4 are from the perspective of a mobile device (e.g. mobile device 110). Mobile device 110 may have one or more components of FIG. 3. For example, mobile device 110 may include processor 302, main memory 304, network interface device 320, and/or other components. Processor 302 may be the FPGA and mobile device 110 may include a second processor (not shown) for performing the FPGA update operation.

At 402, mobile device 110 detects a hardware vulnerability. Mobile device 110 may receive an application for detecting hardware vulnerabilities using network interface 320 over network 326. Mobile device 110 may execute the application using processor 302. However, the mobile device may have a second processor (not shown) for performing FPGA configuration updates. In some embodiments, the update process and the application may be executed by the second processor. The mobile device may reboot in an upgrade mode which will instruct the mobile device to execute code using the second processor.

At 404, mobile device 110, in response to detecting the hardware vulnerability in the mobile device, identifies a fix for the hardware vulnerability. Mobile device 110 may make the identification by executing the downloaded application using processor 302 or the second processor (not shown). At 406, mobile device 110 transmits, to a server (e.g., server 130), a request for the fix to the hardware vulnerability, the request including an identifier of the configuration update to the FPGA. For example, mobile device 110 may transmit the request to server 130 using network interface device 320 via network 326.

At 408, mobile device 110 receives, from the server, the configuration update to the FPGA. For example, mobile device 110 may receive the configuration update via network 326 through network interface device 320. The mobile device may store the received configuration update in main memory 304 and/or storage unit 316. At 410, mobile device 110 overwrites a current FPGA configuration with data from the configuration update. For example, mobile device 110 may have a special update process for overwriting the FPGA configuration. At 412, mobile device 110 determines that the hardware vulnerability no longer exists. For example, the mobile device may execute, using processor 302 or the second processor (not shown) the vulnerability detection application or another application that is able to collect state codes to determine whether the hardware vulnerability has been eliminated.

Figure 5:
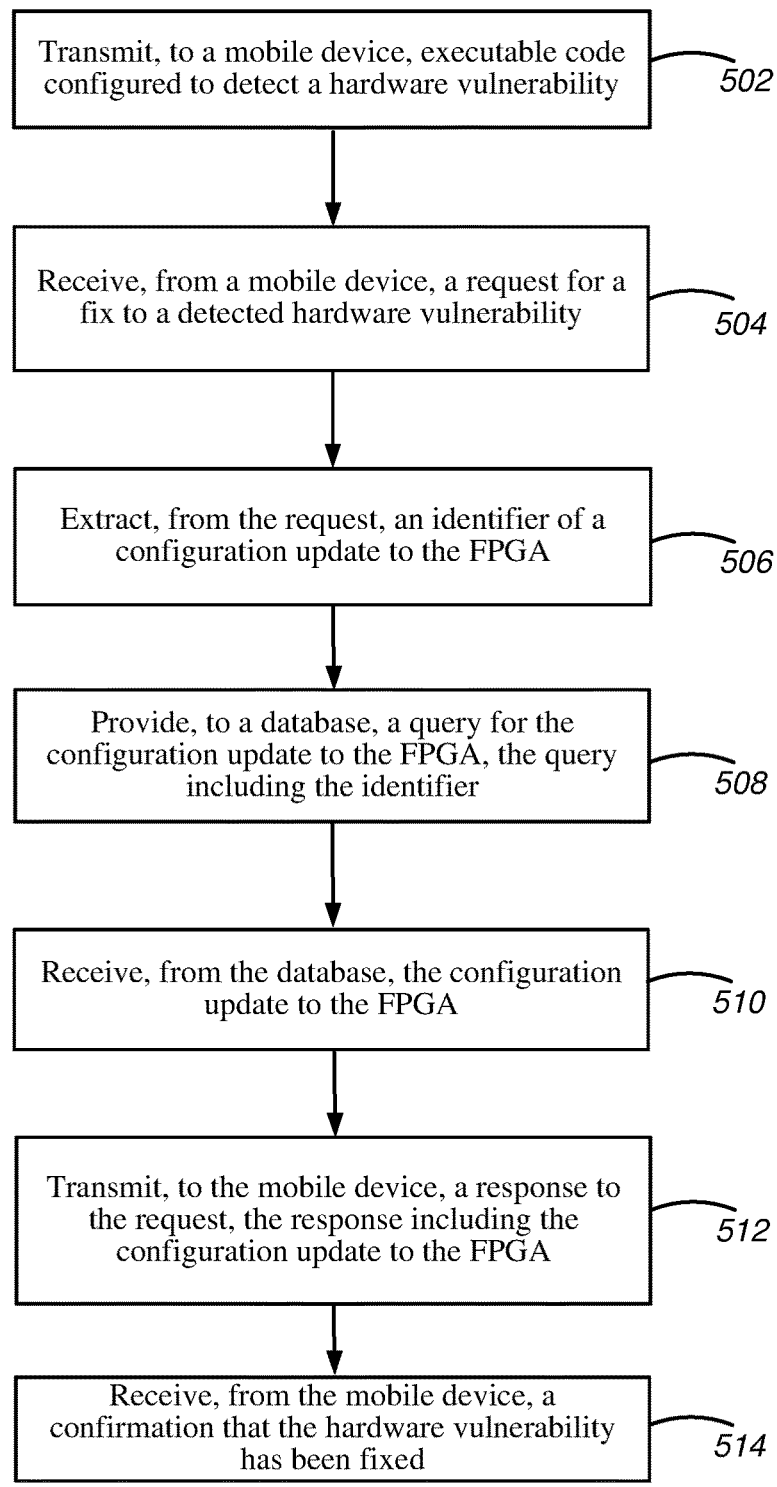
FIG. 5 illustrates another flow chart for wirelessly updating an FPGA, in accordance with some embodiments of this disclosure.

FIG. 5 illustrates another flow chart 500 for wirelessly updating an FPGA, in accordance with some embodiments of this disclosure. The actions of FIG. 5 are from the perspective of a server (e.g., server 130). Server 130 may include one or more components illustrated in FIG. 3. For example, server 130 may include processor 302, main memory 304, network interface device 320, storage unit 316 and/or other components of FIG. 3.

At 502, server 130 transmits, to mobile device 110, executable code configured to detect a hardware vulnerability. Server 130 may perform the transmission using network interface device 320 via network 326. At 504, server 130 receives, from a mobile device, a request for a fix to a detected hardware vulnerability. Server 130 may receive the request via network 326 through network interface device 320. Server 130 may store the received request in main memory 304 and/or storage unit 316.

At 506, server 130 extracts, from the request, an identifier of a configuration update to the FPGA. For example, server 130 may use processor 302 to perform the extraction and store the extracted identifier in main memory 304 and/or storage unit 316. At 508, server 130, provides, to a database, a query for the configuration update to the FPGA, the query including the identifier. Server 130 may retrieve the stored identifier from main memory 304 or from storage unit 316 and generate (e.g., using processor 302) a database query for a configuration update for the FPGA using the extracted identifier. The database may reside on server 130 or on a different server. Thus, server 130 may pass the query to a database engine that resides on server 130 or transmit the query to another server that is hosting the database.

At 510, server 130 receives, from the database, the configuration update to the FPGA. If the database resides on server 130, server 130 may receive the configuration update from the database engine (e.g., database engine 270) and store the configuration update in main memory 304 and/or storage unit 316. If the database resides on another server, server 130 may receive the configuration update using network interface device 320 via network 326. Server 130 may store the received configuration update in main memory 304 and/or storage unit 316.

At 512, server 130 transmits, to the mobile device, a response to the request, the response including the configuration update to the FPGA. For example, server 130 may transmit the response using network interface device 320 over network 326. At 514, server 130 receives, from the mobile device, a confirmation that the hardware vulnerability has been fixed. Server 130 may receive the confirmation using network interface device 320 via network 326.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for preventing recording of security sensitive media content when that content is displayed on a screen through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for wirelessly updating field-programmable gate arrays, the method comprising:

retrieving a plurality of state codes generated by a plurality of hardware devices included in a mobile device that includes a field-programmable gate array (FPGA);

comparing each of the plurality of generated state codes to state codes included in a list of state codes, each of the state codes included in the list of state codes associated with a corresponding hardware vulnerability;

responsive to one of the plurality of generated state codes matching one of the state codes included in the list of state codes, detecting a hardware vulnerability in the mobile device, the hardware vulnerability associated with the matching state code included in the list of state codes;

identifying a configuration update to the FPGA, the configuration update configured to fix the hardware vulnerability;

transmitting, to a server, a request for the configuration update for the FPGA;

receiving, from the server, the configuration update to the FPGA; and overwriting a current FPGA configuration with data from the configuration update.

2. The method of claim 1, wherein identifying the configuration update comprises:

retrieving a hardware vulnerability identifier associated with the matching state code included in the list of state codes;

comparing the hardware vulnerability identifier with each hardware vulnerability identifier in a list of hardware vulnerability identifiers, wherein one or more hardware vulnerability identifiers included in the list of hardware vulnerability identifiers is associated with a configuration update to the FPGA; and responsive to the hardware vulnerability identifier of the matching state code matching a hardware vulnerability identifier in the list of hardware vulnerability identifiers, storing the matching hardware vulnerability identifier.

3. The method of claim 2, wherein transmitting the request for the configuration update comprises:

transmitting, to the server, the matching hardware vulnerability identifier.

4. The method of claim 1, wherein detecting the hardware vulnerability in the mobile device comprises:

receiving, from the server, executable code configured to detect the hardware vulnerability, the executable code configured to cause the plurality of hardware devices to generate the plurality of state codes; and executing the executable code.

5. The method of claim 4, further comprising:

re-executing the executable code using the FPGA with the configuration update responsive to overwriting the current FPGA configuration;

retrieving one or more new state codes generated by the plurality of hardware devices responsive to re-execution of the executable code; and determining that the hardware vulnerability no longer exists responsive to none of the one or more newly generated state codes matching the state codes included in the list of state codes.

6. The method of claim 4, wherein at least one of the executable code or the list of state codes is wirelessly downloaded from the server.

7. A non-transitory computer-readable medium comprising memory with instructions encoded thereon for wirelessly updating field-programmable gate arrays, the instructions when executed cause one or more processors to perform operations including:

retrieving a plurality of state codes generated by a plurality of hardware devices included in a mobile device that includes a field-programmable gate array (FPGA);

comparing each of the plurality of generated state codes to state codes included in a list of state codes, each of the state codes included in the list of state codes associated with a corresponding hardware vulnerability;

responsive to one of the plurality of generated state codes matching one of the state codes included in the list of state codes, detecting a hardware vulnerability in the mobile device, the hardware vulnerability associated with the matching state code included in the list of state codes;

identifying a configuration update to the FPGA, the configuration update configured to fix the hardware vulnerability;

transmitting, to a server, a request for the configuration update for the FPGA;

receiving, from the server, the configuration update to the FPGA; and overwriting a current FPGA configuration with data from the configuration update.

8. The non-transitory computer-readable medium of claim 7, wherein identifying the configuration update comprises:

retrieving a hardware vulnerability identifier associated with the matching state code included in the list of state codes;

comparing the hardware vulnerability identifier with each hardware vulnerability identifier in a list of hardware vulnerability identifiers, wherein one or more hardware vulnerability identifiers included in the list of hardware vulnerability identifiers is associated with a configuration update to the FPGA; and responsive to the hardware vulnerability identifier of the matching state code matching a hardware vulnerability identifier in the list of hardware vulnerability identifiers, storing the matching hardware vulnerability identifier.

9. The non-transitory computer-readable medium of claim 8, wherein transmitting the request for the configuration update comprises:

transmitting, to the server, the matching hardware vulnerability identifier.

10. The non-transitory computer-readable medium of claim 9, wherein detecting the hardware vulnerability in the mobile device comprises:

receiving, from the server, executable code configured to detect the hardware vulnerability, the executable code configured to cause the plurality of hardware devices to generate the plurality of state codes; and executing the executable code.

11. The non-transitory computer-readable medium of claim 10, wherein the instructions when executed further cause the one or more processors to perform operations comprising:

re-executing the executable code using the FPGA with the configuration update responsive to overwriting the current FPGA configuration;

retrieving one or more new state codes generated by the plurality of hardware devices responsive to re-execution of the executable code; and determining that the hardware vulnerability no longer exists responsive to none of the one or more newly generated state codes matching the state codes included in the list of state codes.

12. The non-transitory computer-readable medium of claim 11, wherein at least one of the executable code or the list of state codes is wirelessly downloaded from the server.

13. A mobile device comprising:

a field-programmable gate array (FPGA);

memory including instructions; and one or more processors configured to execute the instructions, the instructions when execute cause the one or more processors to perform operations comprising:

retrieving a plurality of state codes generated by a plurality of hardware devices included in the mobile device;

comparing each of the plurality of generated state codes to state codes included in a list of state codes, each of the state codes included in the list of state codes associated with a corresponding hardware vulnerability;

responsive to one of the plurality of generated state codes matching one of the state codes included in the list of state codes, detecting a hardware vulnerability in the mobile device, the hardware vulnerability associated with the matching state code included in the list of state codes;

identifying a configuration update to the FPGA, the configuration update configured to fix the hardware vulnerability;

transmitting, to a server, a request for the configuration update for the FPGA;

receiving, from the server, the configuration update to the FPGA; and overwriting a current FPGA configuration with data from the configuration update.

14. The device of claim 13, wherein identifying the configuration update comprises:

retrieving a hardware vulnerability identifier associated with the matching state code included in the list of state codes;

comparing the hardware vulnerability identifier with each hardware vulnerability identifier in a list of hardware vulnerability identifiers, wherein one or more hardware vulnerability identifiers included in the list of hardware vulnerability identifiers is associated with a configuration update to the FPGA; and responsive to the hardware vulnerability identifier of the matching state code matching a hardware vulnerability identifier in the list of hardware vulnerability identifiers, storing the matching hardware vulnerability identifier.

15. The device of claim 14, wherein transmitting the request for the configuration update comprises:

transmitting, to the server, the matching hardware vulnerability identifier.

16. The deice of claim 15, wherein detecting the hardware vulnerability in the mobile device comprises:

receiving, from the server, executable code configured to detect the hardware vulnerability, the executable code configured to cause the plurality of hardware devices to generate the plurality of state codes; and executing the executable code.

17. The device of claim 16, wherein the instructions when executed further cause the one or more processors to perform operations comprising:

re-executing the executable code using the FPGA with the configuration update responsive to overwriting the current FPGA configuration;

retrieving one or more new state codes generated by the plurality of hardware devices responsive to re-execution of the executable code; and determining that the hardware vulnerability no longer exists responsive to none of the one or more newly generated state codes matching the state codes included in the list of state codes.

\* \* \* \* \*

UNITED STATES PATENT AND TRADEMARK OFFICE
CERTIFICATE OF CORRECTION

PATENT NO. : 11,455,159 B2
APPLICATION NO. : 16/941393
DATED : September 27, 2022
INVENTOR(S) : Michael Mattioli It is certified that error appears in the above-identified patent and that said Letters Patent is hereby corrected as shown below:

In the Claims

In Column 14, in Claim 16, Line 58, delete "deice" and insert -- device --, therefor.

Signed and Sealed this
Twenty-seventh Day of December, 2022

*Katherine Kelly Vidal*

Katherine Kelly Vidal
*Director of the United States Patent and Trademark Office*